United States Patent
Kim

(10) Patent No.: US 8,527,778 B2
(45) Date of Patent: Sep. 3, 2013

(54) APPARATUS AND METHOD FOR PREVENTING FALSIFICATION OF BLACK BOX DATA

(75) Inventor: Moo Seop Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 458 days.

(21) Appl. No.: 12/788,526

(22) Filed: May 27, 2010

(65) Prior Publication Data

US 2011/0087893 A1 Apr. 14, 2011

(30) Foreign Application Priority Data

Oct. 14, 2009 (KR) .................. 10-2009-0097875

(51) Int. Cl.
*H04L 29/06* (2006.01)
(52) U.S. Cl.
USPC ............ 713/189; 713/170; 713/176; 713/178
(58) Field of Classification Search
USPC .................................. 713/170, 189
See application file for complete search history.

(56) References Cited

U.S. PATENT DOCUMENTS

| | | | |
|---|---|---|---|
| 2003/0193404 A1* | 10/2003 | Joao | 340/825.71 |
| 2007/0266250 A1* | 11/2007 | Kampert et al. | 713/176 |

FOREIGN PATENT DOCUMENTS

| | | | |
|---|---|---|---|
| JP | 10-086861 A | | 4/1998 |
| JP | 2003-087234 A | | 3/2003 |
| JP | 2004-338607 A | | 12/2004 |
| KR | 1020000013317 A | | 3/2000 |
| KR | 1020020068186 A | | 8/2002 |
| KR | 1020050108515 A | | 11/2005 |
| KR | 1020060094042 A | | 8/2006 |
| KR | 1020090101332 A | | 9/2009 |
| WO | WO 9713208 A1 * | | 4/1997 |

* cited by examiner

*Primary Examiner* — Justin T Darrow

(57) ABSTRACT

Provided are an apparatus and method for preventing falsification of black box data. The apparatus for preventing falsification of black box data includes a driving information storage module and a falsification prevention module. The driving information storage module stores a driving information data which is collected by a black box. The falsification prevention module encrypts the driving information data to generate a falsification determination data through a predetermined encryption mechanism, and stores the falsification determination data.

16 Claims, 4 Drawing Sheets

APPARATUS AND METHOD FOR PREVENTING FALSIFICATION OF BLACK BOX DATA

CROSS-REFERENCE TO RELATED APPLICATIONS

This application claims priority under 35 U.S.C. §119 to Korean Patent Application No. 10-2009-0097875, filed on Oct. 14, 2009, in the Korean Intellectual Property Office, the disclosure of which is incorporated herein by reference in its entirety.

TECHNICAL FIELD

The following disclosure relates to a technology for preventing falsification of data, and in particular, to an apparatus and method for preventing falsification of black box data, which can secure the objective reliability of data.

BACKGROUND

Recently, black boxes or Digital Video Recorders (DVRs) for vehicle are being widely used to store accident circumstances or the overall circumstances of a driving process. The black box or the DVR for vehicle is recognized as most suitable evidence for coping with cases in which accident-related disputes for mobile objects occur, at this time.

However, since a related art black box simply stores only data, it is impossible to check whether the stored data is authentic. When possibility for the falsification of data is proposed, it may be hard to trust the related art black box as objective evidence.

SUMMARY

In one general aspect, an apparatus for preventing falsification of black box data includes: a driving information storage module storing a driving information data which is collected by a black box; and a falsification prevention module encrypting the driving information data to generate a falsification determination data through a predetermined encryption mechanism, and storing the falsification determination data.

In another general aspect, a falsification prevention module for black box data includes: a key management unit providing a predetermined encryption mechanism; an encryption processing unit encrypting a driving information data, which is collected by a black box, through the encryption mechanism to generate a falsification determination data; and a determination data storage unit storing the falsification determination data.

In another general aspect, a method for preventing falsification of black box data includes: encrypting a driving information data which is collected by a black box to generate a falsification determination data through a predetermined encryption mechanism; storing the falsification determination data; and providing an encryption mechanism for verifying integrity of the driving information data, when an authenticated user requests use of the driving information data.

Other features and aspects will be apparent from the following detailed description, the drawings, and the claims.

DETAILED DESCRIPTION OF EMBODIMENTS

Figure 1:
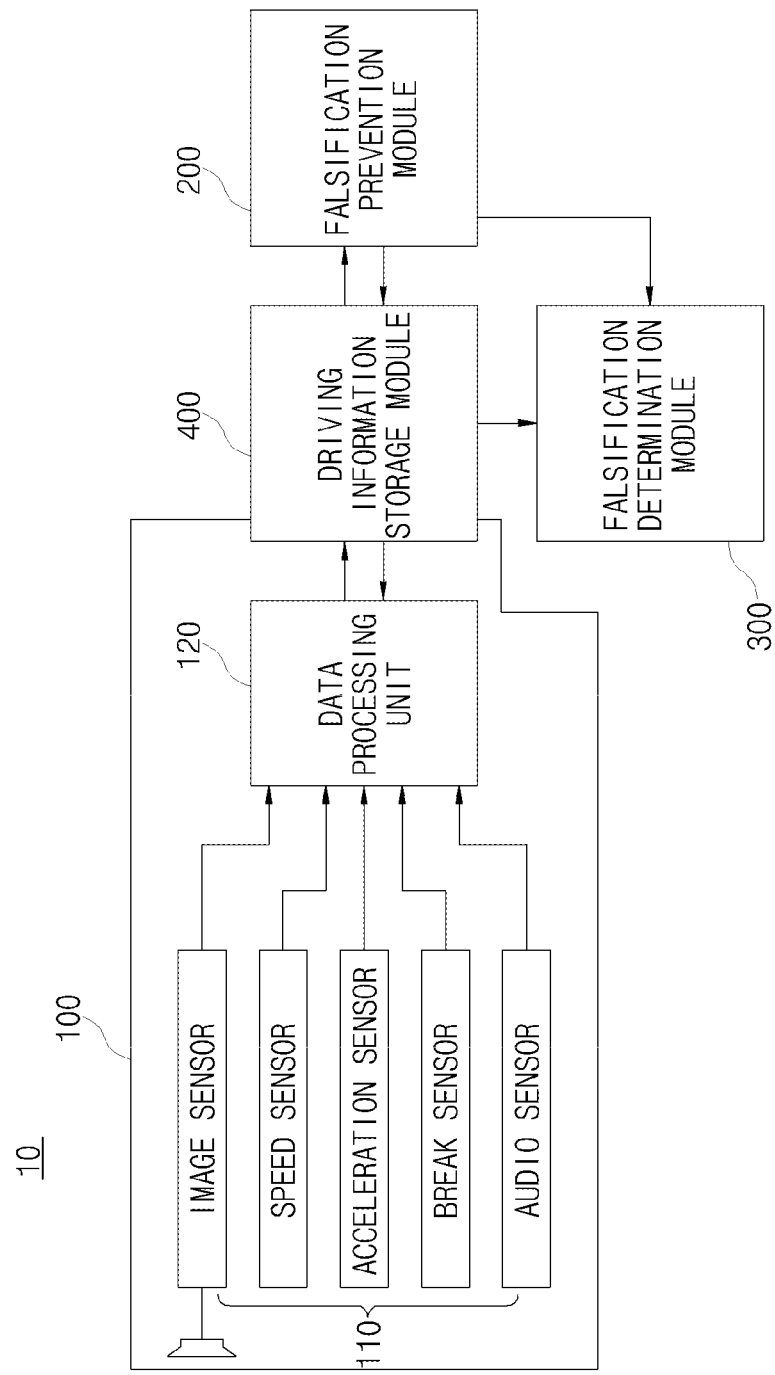
FIG. 1 is a block diagram illustrating an apparatus for preventing falsification of black box data according to an exemplary embodiment.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, an apparatus for preventing falsification of black box data according to an exemplary embodiment will be described with reference to FIG. 1.

FIG. 1 is a block diagram illustrating an apparatus for preventing falsification of black box data according to an exemplary embodiment.

Referring to FIG. 1, an apparatus 10 for preventing falsification of black box data according to an exemplary embodiment includes a black box 100, a driving information storage module 400, a falsification prevention module 200, and a falsification determination module 300.

The black box 100 collects the driving information of a mobile object such as a vehicle, a ship or an airplane in which it is disposed, and includes a plurality of sensors 110 and a data processing unit 120.

The plurality of sensors 110 comprise an image sensor, an audio sensor, a speed sensor, an acceleration sensor, and a break sensor. Specifically, the image sensor collects the internal and external image data of the mobile object. The audio sensor collects the internal and external audio data of the mobile object. The speed sensor, the acceleration sensor, and the break sensor collect information for the driving and moving of the mobile object.

The data processing unit 120 processes (for example, analog-to-digital converts) the information that is collected through the sensors 110 and stores the processed information in the driving information data storage module 400. At this point, the data processing unit 120 processes the collected information in predetermined units (for example, a certain time unit and a certain block unit) in consideration of the capacity and block size of the driving information storage module 400, and stores the processed driving information data in the driving information storage module 400.

The driving information storage module 400 stores a driving information data that is transferred from the black box 100. For example, the driving information storage module 400 may be an attachable/detachable storage medium such as a Multi-Media Card (MMC), a Secure Digital (SD) card, or a Universal Serial Bus (USB) memory stick. Herein, the driving information storage module 400 may be included in the black box 100.

The falsification prevention module 200 encrypts the driving information data, which is stored in the driving information storage module 400, through a predetermined encryption mechanism to generate and store a falsification determination data. At this point, the falsification prevention module 200 may encrypt total driving information data that are stored in the driving information storage module 400 at one time, or may encrypt the driving information data in a predetermined block unit to generate the falsification determination data of the predetermined block unit.

The falsification prevention module 200 may use an encryption mechanism such as a hash function, a keyed-Hash Message Authentication Code (HMAC), a symmetric key or a public key.

The falsification prevention module 200 may store the encrypted driving information data, i.e., the falsification determination data in the designated region of the driving information storage module 400 or a separate memory.

The falsification prevention module 200 may perform encryption in real time, and may perform encryption for each predetermined certain period or certain capacity. Moreover, when a user's request or an external impulse is recognized, the falsification prevention module 200 may perform encryption in synchronization with it. At this point, the falsification prevention module 200 may additionally use the stored time of the driving information data, the unique number of the black box 100 and the pointer of the falsification determination data. The detailed configuration of the falsification prevention module 200 will be described below with reference to FIG. 2.

The falsification determination module 300 verifies the integrity of the driving information data that is stored in the driving information storage module 400 to determine whether the stored driving information data is falsified.

For example, the falsification determination module 300 may encrypt the stored driving information data through the same encryption mechanism as one that is used in the falsification prevention module 200, and may compare the encryption result value with the falsification determination data to determine whether the stored driving information data is falsified. Herein, when the falsification prevention module 200 uses the stored time of the driving information data, the unique number of the black box 100 and the pointer of the falsification determination data, the falsification determination module 300 may additionally use them, and moreover, may also use the storage region information of the falsification determination data.

The falsification determination module 300 may not be included in the apparatus 10 for preventing falsification of black box data but be implemented as an attachable/detachable medium, and only when checking falsification the falsification determination module 300 may be assembled and used. The detailed configuration of the falsification determination module 300 will be described below with reference to FIG. 3.

In this way, the apparatus 10 according to an exemplary embodiment can verify the integrity of black box data, thereby enabling the cause of an accident to be analyzed with only the black box data.

In addition, the apparatus 10 according to an exemplary embodiment can easily be applied by using an additional attachable/detachable medium even without changing and again disposing the hardware or software of a black box that has already been disposed.

Hereinafter, a falsification prevention module according to an exemplary embodiment will be described with reference to FIG. 2.

Figure 2:
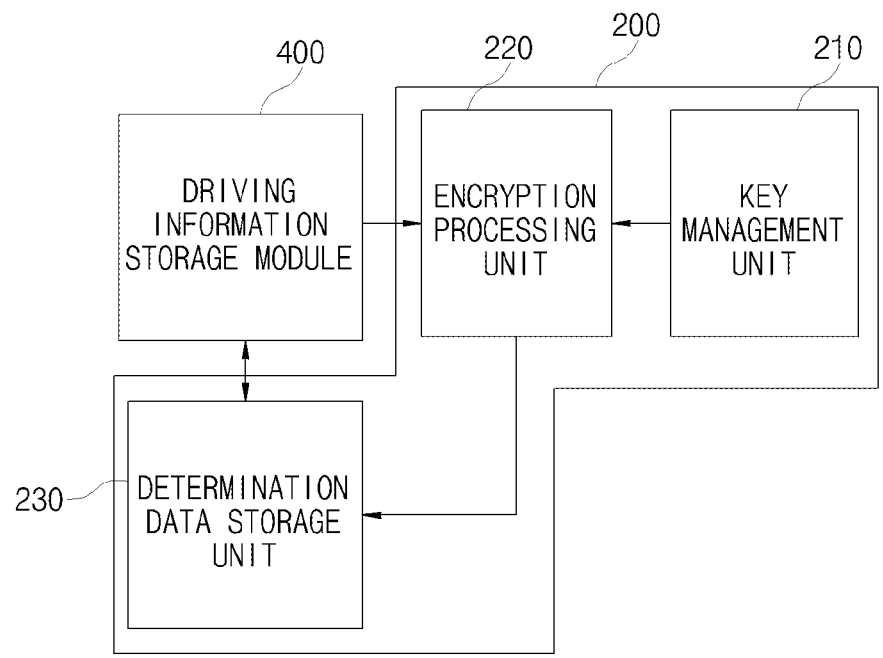
FIG. 2 is a block diagram illustrating a falsification prevention module according to an exemplary embodiment.

FIG. 2 is a block diagram illustrating a falsification prevention module according to an exemplary embodiment.

Referring to FIG. 2, the falsification prevention module 200 according to an exemplary embodiment includes a key management unit 210, an encryption processing unit 220, and a determination data storage unit 230.

Like an HMAC or a symmetric key encryption mechanism, when key information is required for performing an encryption operation, the key management unit 210 stores and manages the key information. Accordingly, when using a hash function requiring no key information, the key management unit 210 may be omitted.

The encryption processing unit 220 encrypts a driving information data through an encryption mechanism such as a hash function to generate a falsification determination data, and stores the falsification determination data in the determination data storage unit 230. At this point, the encryption processing unit 220 reads the stored driving information data in real time or at certain time (for example, ten minutes or one hour) and encrypts the driving information data through a predetermined encryption mechanism.

The encryption processing unit 220 encrypts a driving information data that is collected by the black box 100. For increasing the reliability of the driving information data that is inputted when performing encryption, the encryption processing unit 220 may additionally use the unique number of the black box 100, information for the stored time of each data and the storage region information of each data, in addition to the driving information data.

The determination data storage unit 230 stores the falsification determination data that is outputted from the encryption processing unit 220. At this point, the determination data storage unit 230 may provide a tampering prevention function.

Herein, the determination data storage unit 230 may be configured with the same elements as those of the driving information storage module 400 in FIG. 1. That is, the determination data storage unit 230 or the driving information storage module 400 may be configured with a first region for storing the driving information data that is collected by the black box 100 and a second region for storing the falsification determination data. In this case, by allowing the unit block of each driving information data for hash processing and a hash-processed falsification determination data to have respective pointers, falsification can easily be determined after.

For example, when the encryption processing unit 220 encrypts a driving information data through a hash function, verifying integrity and determining falsification are also performed through the hash function. That is, the hash function hash-processes an input having a certain length to generate a message digest of a predetermined certain length and has a one directionality in which it cannot recover the original data from hash-processed data. Therefore, when the hash-processed data is the same as a result data that is obtained by again hash processing the original data, the original data or the hash-processed data is determined as having reliability.

Most encryption mechanisms other than a hash function provide various schemes that may verify the integrity of the original data or encrypted data, and thus the apparatus 10 according to an exemplary embodiment can increase the objective reliability of data that is collected by the black box 10 through the integrity verifying scheme.

In this way, the apparatus 10 according to an exemplary embodiment verifies the integrity of a driving information data that is collected by a black box to determine whether the driving information data is falsified through an encryption mechanism, thereby analyzing the accident cause of a mobile object with the verified data.

Hereinafter, a falsification determination module according to an exemplary embodiment will be described with reference to FIG. 3.

Figure 3:
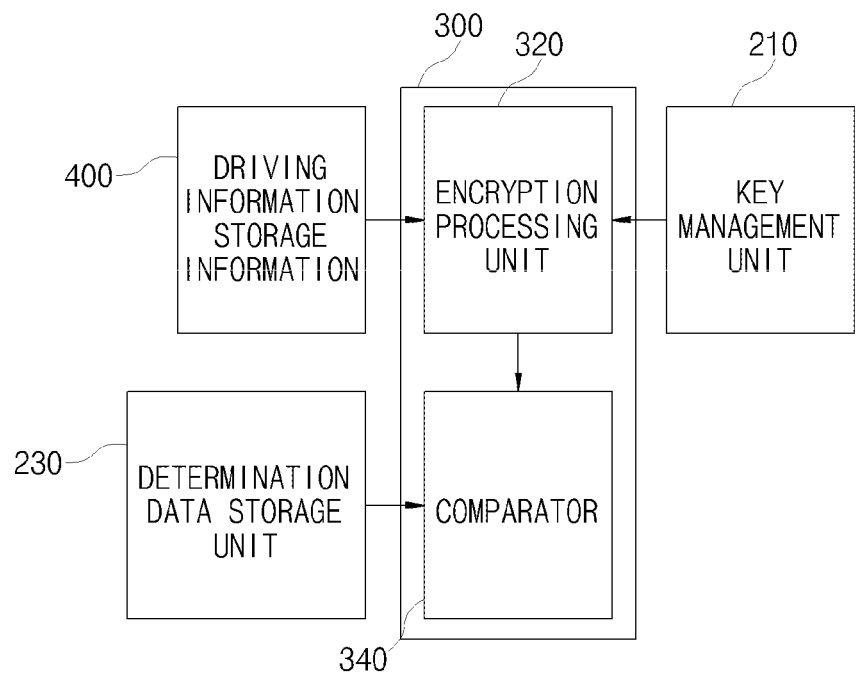
FIG. 3 is a block diagram illustrating a falsification determination module according to an exemplary embodiment.

FIG. 3 is a block diagram illustrating a falsification determination module according to an exemplary embodiment.

Referring to FIG. 3, the falsification determination module 300 according to an exemplary embodiment includes an encryption processing unit 320 and a comparator 340.

The encryption processing unit 320 performs an encryption operation on a driving information data that is provided from the driving information storage module 400, identically to the falsification prevention module 200, and transfers the encrypted data to the comparator 340. At this point, when key information is used in the encryption operation of the falsification prevention module 200, the encryption processing unit 320 receives the same key information from the key management unit 210 and uses the received key information.

The comparator 340 compares the encrypted driving information data that is transferred from the encryption processing unit 320 and a falsification determination data that is stored in the determination data storage unit 230 to determine whether data provided from the driving information storage module 400 is falsified.

That is, when the falsification determination data that is stored in the determination data storage unit 230 is the same as the data that is encrypted by the encryption processing unit 320, the comparator 340 determines the driving information data, which is provided from the driving information storage module 400, as reliable information that is not falsified. When the falsification determination data that is stored in the determination data storage unit 230 is different from the data that is encrypted by the encryption processing unit 320, the comparator 340 determines the driving information data, which is provided from the driving information storage module 400, as unreliable information. At this point, the comparator 340 may output a true signal (for example, a high signal) when the driving information data is determined as reliable information, and the comparator 340 may output a false signal (for example, a low signal) when the driving information data is determined as unreliable information.

As an example, in FIG. 3, a scheme has been described above in which the falsification determination module 300 performs the same encryption operation as that of the falsification prevention module 200 and compares encryption results to verify the integrity of a driving information data. But the falsification determination module 300 may verify the integrity of the driving information data and falsification determination data through various integrity verifying schemes that is not limited thereto.

Moreover, FIG. 3 illustrates a case in which the falsification determination module 300 separately includes the encryption processing unit 320 as an example. However, the falsification determination module 300 may not separately include the encryption processing unit 320 but share the encryption processing unit 220 that is included in the falsification verification module 200.

Hereinafter, a method for preventing falsification of black box data according to an exemplary embodiment will be described with reference to FIG. 4.

Figure 4:
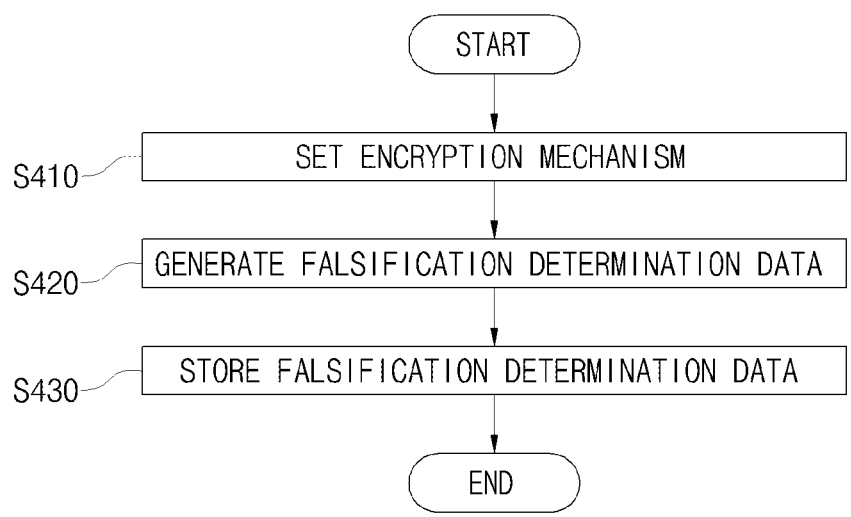
FIG. 4 is a flow chart illustrating a method for preventing falsification of black box data according to an exemplary embodiment.

FIG. 4 is a flow chart illustrating a method for preventing falsification of black box data in the falsification prevention module 200, according to an exemplary embodiment.

Referring to FIG. 4, the falsification prevention module 200 sets an encryption mechanism for a driving information data that is collected by the black box 100 in operation S410.

Subsequently, the falsification prevention module 200 encrypts the driving information data through the set encryption mechanism to generate a falsification determination data in operation S420.

At this point, the falsification prevention module 200 may perform encryption in real time, or may perform encryption at predetermined certain time or whenever a predetermined certain capacity is stored. Moreover, the falsification prevention module 200 may additionally use the stored time of the driving information data and the unique number of the black box 100.

The falsification prevention module 200 stores a falsification determination data in operation S430.

When an authenticated user (for example, the user of the falsification determination module 300) requests the use of the driving information data, the falsification prevention module 200 may provide an encryption mechanism for verifying the integrity of the driving information data. Moreover, the falsification prevention module 200 may reject an unauthenticated user's request.

Hereinafter, a method for determining falsification of black box data according to an exemplary embodiment will be described with reference to FIG. 5.

Figure 5:
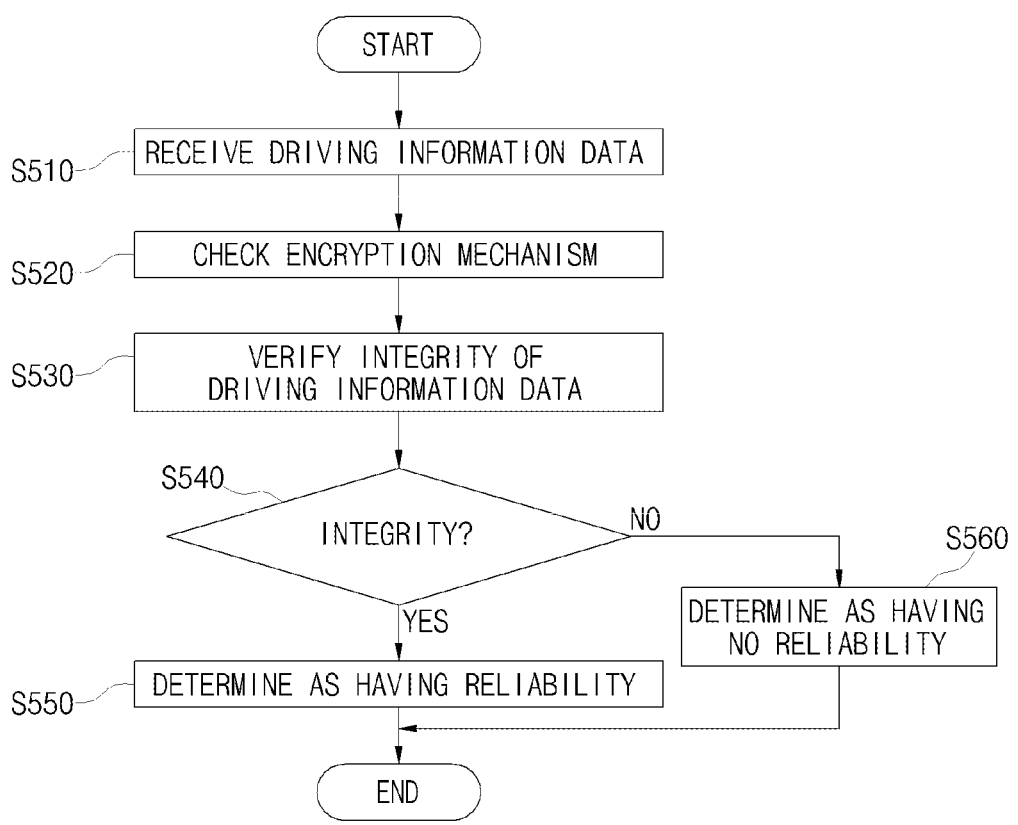
FIG. 5 is a flow chart illustrating a method for determining falsification of black box data according to an exemplary embodiment.

FIG. 5 is a flow chart illustrating a method for determining falsification of black box data in the falsification determination module 300, according to an exemplary embodiment.

Referring to FIG. 5, the falsification determination module 300 receives a driving information data from the driving information storage module 400 in operation S510.

Subsequently, the falsification determination module 300 checks an encryption mechanism that is set by the falsification prevention module 200 in operation S520.

The falsification determination module 300 verifies the integrity of the driving information data to determine whether the driving information data is falsified through the encryption mechanism in operation S530.

At this point, when there is integrity in operation S540, the falsification determination module 300 determines the received driving information data as reliable information that is not falsified in operation S550. That is, the falsification determination module 300 encrypts a driving information data through an encryption mechanism, and when a falsification determination data is the same as the encrypted driving information data may determine the received driving information data as not being falsified.

On the other hand, when there is no integrity, the falsification determination module 300 determines the received driving information data as unreliable information that is falsified in operation S560. That is, when the encrypted driving information data is not the same as the falsification determination data, the falsification determination module 300 may determine the received driving information data as being falsified. At this point, a user may perform edition (for example, remove falsification) for recovering the reliability of the driving information data through the falsification determination module 300 or a separate device.

When the stored time of the driving information data, storage region information or the unique number of a black box is additionally used by the falsification prevention module 200, the falsification determination module 300 may additionally use the information for determining falsification.

In this way, the method according to an exemplary embodiment verifies the integrity of data, and thus increases the reliability of a black box data, thereby increasing reliability for the analysis of an accident cause.

In addition, the method according to an exemplary embodiment can easily be applied by using an additional attachable/detachable medium even without changing and again disposing the hardware or software of a black box that has already been disposed.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for preventing falsification of black box data, comprising:
    a driving information storage module storing driving information data which is collected by a black box;
    a falsification prevention module encrypting the driving information data to generate falsification determination data through a predetermined encryption mechanism, and storing the falsification determination data; and
    a falsification determination module verifying integrity of the stored driving information data to determine whether the stored driving information data is falsified, wherein the falsification determination module encrypts the stored driving information data through the predetermined encryption mechanism, and compares the encrypted driving information data and the falsification determination data to determine whether the stored driving information data is falsified.

2. The apparatus of claim 1, wherein the falsification prevention module performs encryption in real time or at predetermined intervals, and performs encryption when a user's request is inputted or an external impulse is recognized.

3. The apparatus of claim 1, wherein the falsification prevention module stores the encrypted driving information data in the driving information storage module or a separate memory.

4. The apparatus of claim 1, wherein the falsification prevention module uses at least one encryption mechanism of a hash function, a keyed-Hash Message Authentication Code (HMAC), a symmetric key and a public key.

5. The apparatus of claim 1, wherein the falsification prevention module uses a unique number of the black box or a stored time of the driving information data when generating the falsification determination data.

6. The apparatus of claim 1, wherein the black box is disposed in a mobile object which comprises a vehicle, a ship and an airplane.

7. A falsification prevention module for black box data, comprising:
    a key management unit providing a predetermined encryption mechanism;
    an encryption processing unit encrypting driving information data, which is collected by a black box, through the encryption mechanism to generate falsification determination data;
    a determination data storage unit storing the falsification determination data; and
    a falsification verification module verifying integrity of the driving information data to check whether the driving information data is falsified, wherein the falsification verification module encrypts the driving information data through the predetermined encryption mechanism, and compares the encrypted driving information data and the falsification determination data to determine whether the stored driving information data is falsified.

8. The falsification prevention module of claim 7, wherein: the falsification prevention module further comprises a separate storage unit storing the driving information data which is collected by the black box, or the determination data storage unit is divided into a first region storing the driving information data which is collected by the black box and a second region storing the falsification determination data.

9. The falsification prevention module of claim 7, wherein the determination data storage unit provides a tampering prevention function.

10. The falsification prevention module of claim 7, wherein the falsification verification module uses the encryption processing unit when verifying the integrity of the driving information data.

11. The falsification prevention module of claim 7, wherein the encryption processing unit reads out and encrypts the driving information data, which is collected in the black box, in predetermined capacity unit or predetermined interval unit.

12. A method for preventing falsification of black box data, the method comprising:
    encrypting driving information data which is collected by a black box to generate falsification determination data through a predetermined encryption mechanism;
    storing the falsification determination data;
    providing an encryption mechanism for verifying integrity of the driving information data, when an authenticated user requests use of the driving information data, comprising:
    encrypting the driving information data through the predetermined encryption mechanism;
    comparing the falsification determination data and the encrypted driving information data; and
    determining the driving information data as not being falsified when the falsification determination data is the same as the encrypted driving information data.

13. The method of claim 12, wherein the encrypting of a driving information data is performed in real time, at predetermined certain time or whenever a predetermined certain capacity is stored.

14. The method of claim 12, wherein the providing of an encryption mechanism comprises:
    receiving request for use of the driving information data;
    checking whether the request was sent from the authenticated user; and
    providing the encryption mechanism when the request was sent from the authenticated user.

15. The method of claim 12, further comprising determining the driving information data as being falsified when the falsification determination data is not the same as the encrypted driving information data.

16. The method of claim 12, wherein the generating of a falsification determination data, a stored time of the driving information data and a unique number of the black box are used.

* * * * *